US005340145A

United States Patent [19]
Leib et al.

[11] Patent Number: 5,340,145
[45] Date of Patent: Aug. 23, 1994

[54] COLLAPSIBLE TRAILER

[76] Inventors: Donald Leib, 25052 Silver Leaf La., Laguna Hills, Calif. 92653; Kenneth Thurm, 2348 N. Rockridge Cir., Orange, Calif. 92667

[21] Appl. No.: 922,106

[22] Filed: Jul. 29, 1992

[51] Int. Cl.⁵ .............................................. B62B 1/04
[52] U.S. Cl. .................................. 280/656; 280/491.1
[58] Field of Search ............... 280/656, 639, 638, 35, 280/47.33, 491.1, 494.4

[56]  References Cited
U.S. PATENT DOCUMENTS

| | | | |
|---|---|---|---|
| 2,229,653 | 1/1941 | Hohl | 280/656 X |
| 4,362,316 | 12/1982 | Wright | 280/656 |
| 4,480,851 | 11/1984 | St-Pierre | 280/656 |
| 4,768,806 | 9/1988 | Tetreault | 280/656 |

FOREIGN PATENT DOCUMENTS 624033  5/1949  United Kingdom ................ 280/656

OTHER PUBLICATIONS

K-Mart Utility Trailer (Advertisement).

Primary Examiner—Margaret A. Focarino
Assistant Examiner—Michael Mar
Attorney, Agent, or Firm—Stroock & Stroock & Lavan

[57]  ABSTRACT

A collapsible trailer includes a first platform and a second platform which is pivotably mounted to the first platform so that the second platform may move between an open and closed position. A support arm is mounted on the first platform and extends to contact the second platform at a position substantially away from the pivot axis of the second platform when in the open position. The support arms shares a load applied to the second platform between the first platform and the second platform.

8 Claims, 7 Drawing Sheets

COLLAPSIBLE TRAILER

BACKGROUND OF THE INVENTION

The present invention is directed to a trailer which is foldable upon itself for storage, and in particular, a collapsible trailer capable of supporting great weights such as motorcycles and jet skis.

Collapsible trailers are known in the art and are formed with a platform having a front portion and a rear portion. The back portion is pivotably coupled to the front platform portion so that the platform may fold upon itself. Each platform is mounted on a subframe which in turn is mounted through a leaf spring to an axle supported between the wheels. The subframe includes a flange forming an underhang extending from the front platform portion to beyond the pivot point of the back platform so that when the trailer is in the open position, i.e., the back platform portion is rotated away from the front platform portion, the underhang acts as a rotation stop and provides support for the back platform portion. Rails are provided on the front platform portion and back platform portion which when in the open position form a continuous channel for receiving motorcycle wheels to maintain the motorcycle in place.

The prior art collapsible trailers have been satisfactory. However, they suffer from several disadvantages. First, because the back platform portion is supported by a short flange of the subframe, the support in the trailer resides in the middle of the trailer, not at the far ends of the unfolded platforms so that when a large load such as a motorcycle is provided at the end of the back platform portion when loading, the flange rather than stopping the rotation of the back platform portion becomes a pivot for further rotation and the back platform portion breaks or shears from the subframe and front platform portion. Extending the underhang to provide greater support requires an inordinate amount of material such as steel tubing, adding weight to the trailer making the trailer difficult to tow and maneuver and making the entire trailer fuel inefficient. Secondly, by utilizing a leaf spring arrangement for the wheel support requires additional bars affixed to the subframe to provide connection points for the leaf spring, adding weight to the trailer. Additionally, because all of the support for the front platform and back platform is provided at the center of the open platform, and there is no support at the extreme ends of the open platform, the platform is formed as a square with a substantially solid bedding below the rails further increasing the trailer's weight and moving the weight of the folded trailer away from the center towards the top of the trailer making the trailer extremely difficult to place in an upright position for storage. Accordingly, it is desirable to provide a collapsible trailer providing support near the back and front of the open trailer while utilizing less material for lighter weight, ease of manufacture and fuel efficiency.

SUMMARY OF THE INVENTION

Generally speaking, in accordance with the invention, a first platform portion is pivotally mounted to a second platform portion so that the second platform portion is pivotable between a closed and open position. Wheels are mounted to the first platform portion. A support arm is mounted on the first platform portion and extends substantially beyond the pivot of the first platform portion and second platform portion and provides a support for the second platform portion when the second platform portion is in the open position, the support being at a point substantially beyond the pivot.

Each platform portion includes a tubular support formed as a triangle. At least one rail is mounted on the triangular support, the rail of the first platform portion being pivotably mounted to the rail of the second platform portion so that a continuous channel is formed across the front platform portion and back platform portion when the trailer is in the open position. A support tube is affixed to the front platform and a wheel supported at both ends thereof. A second support is mounted on the second platform. The first support and second support having wheels mounted thereon and the wheels being positioned to come in contact with the ground to support the trailer when in the closed position and tilted in an orientation substantially 90° to the ground.

Accordingly, it is an object of the invention to provide an improved collapsible trailer.

A further object of the invention is to provide a collapsible trailer which utilizes less material resulting in lighter weight, ease of manufacture and fuel efficiency.

Yet another object of the invention is to provide a collapsible trailer which when in the open position provides load support away from the center of the trailer.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Reference is made to FIGS. 1-7 wherein a collapsible trailer generally indicated as 20 constructed in accordance with the invention is shown. Trailer 20 includes a front platform 22 and a rear platform 24 pivotably mounted to front platform 22. A wheel assembly, generally indicated as 26, is mounted on front platform 22. A load support assembly, generally indicated as 28, is mounted on front platform 22 and extends to come in contact with rear platform 24.

Figure 1:
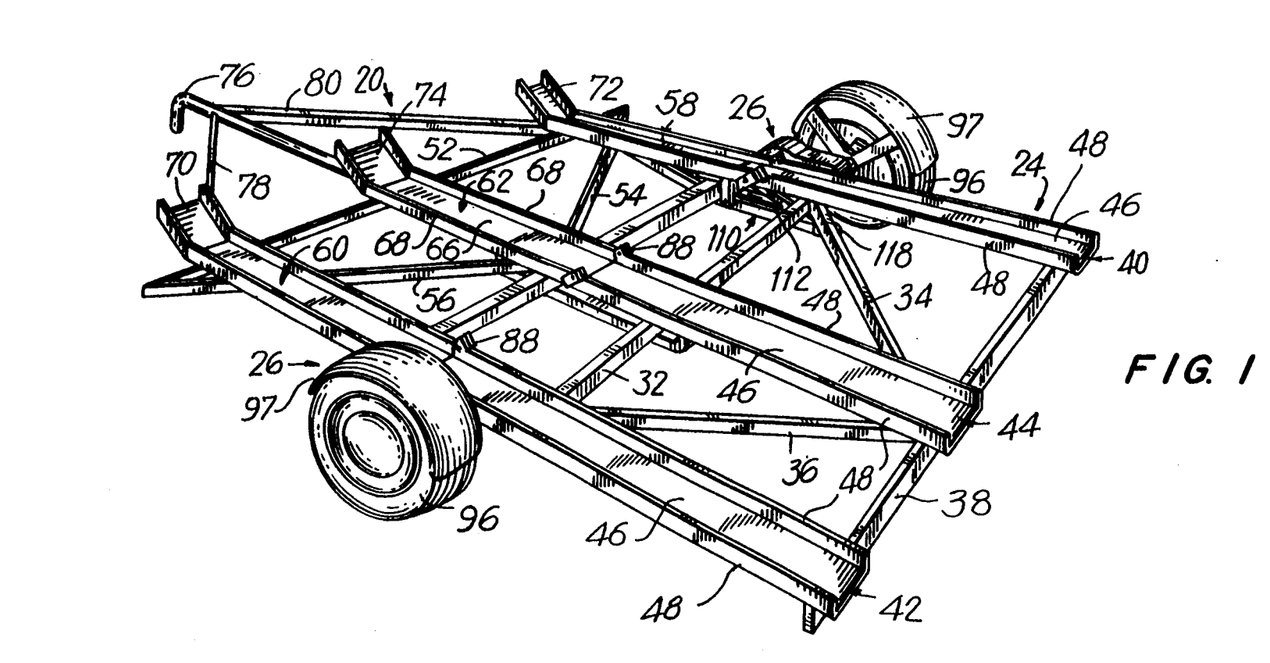
FIG. 1 is a perspective view of a collapsible trailer constructed in accordance with the invention in the open position.
Figure 2:
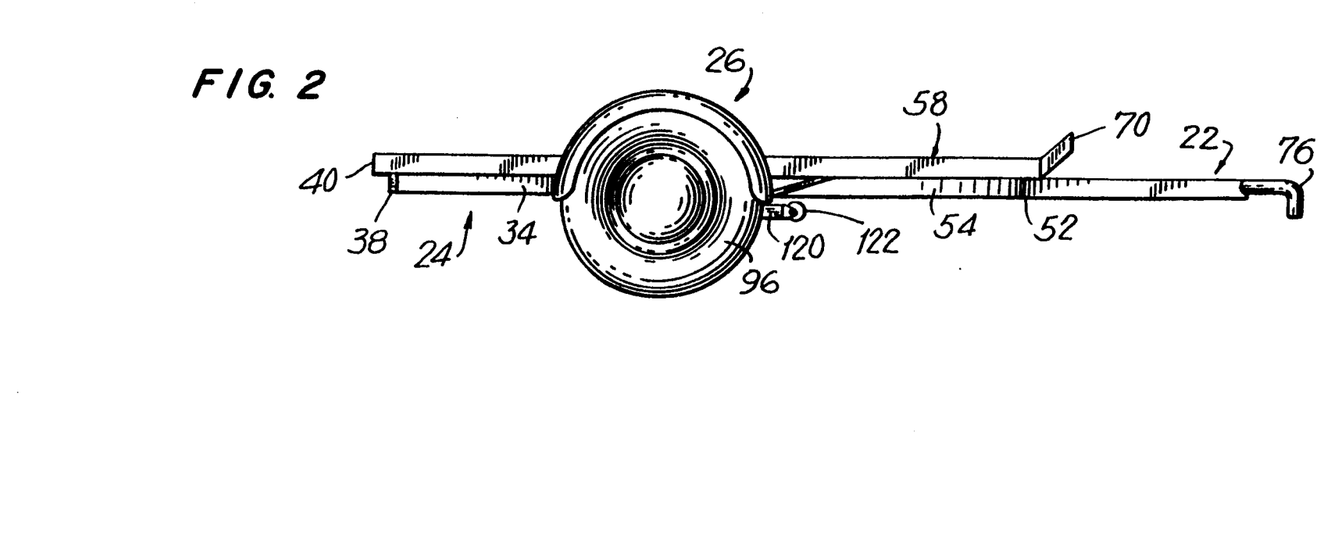
FIG. 2 is a right side elevational view of a collapsible trailer constructed in accordance with the invention.
Figure 3:
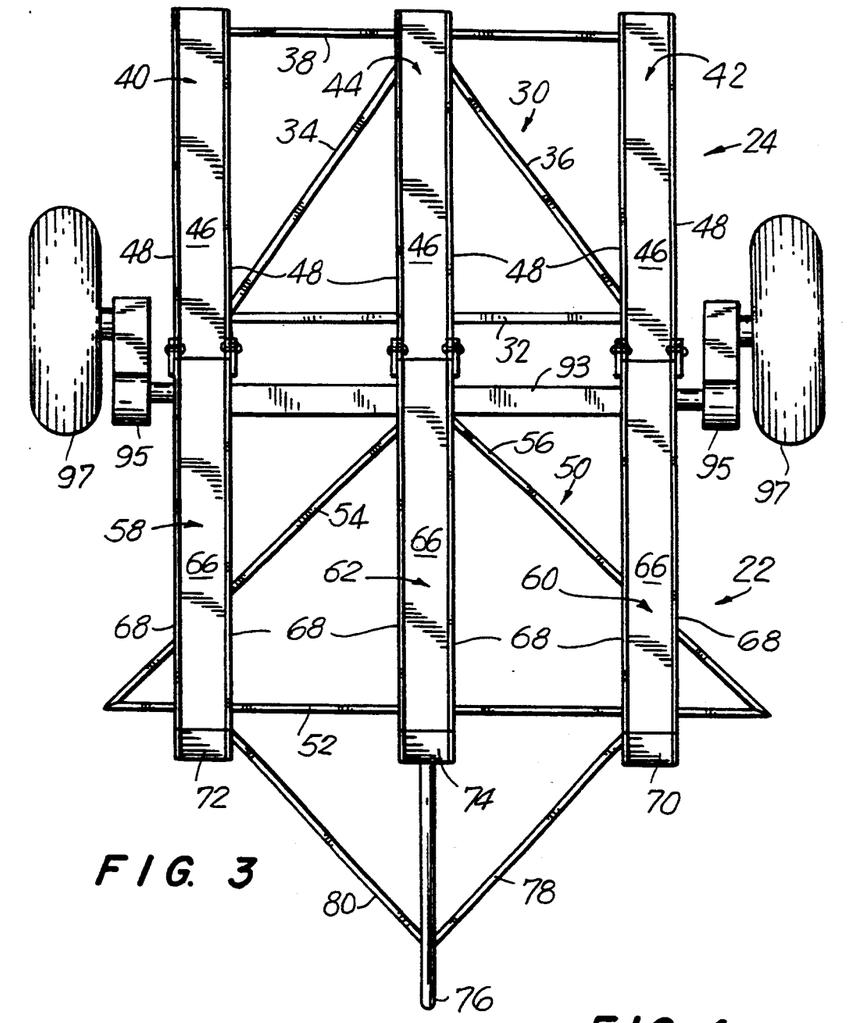
FIG. 3 is a top plan view of a collapsible trailer constructed in accordance with the invention.
Figure 4:
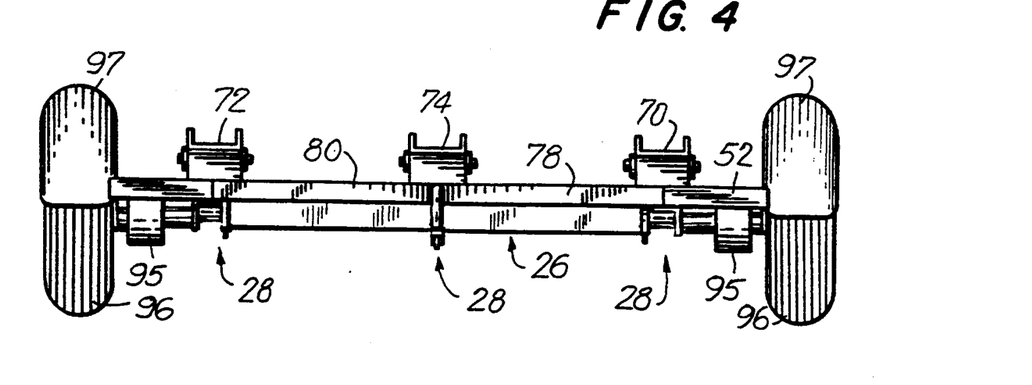
FIG. 4 is a front elevational view of a collapsible trailer construction in accordance with the invention.
Figure 5:
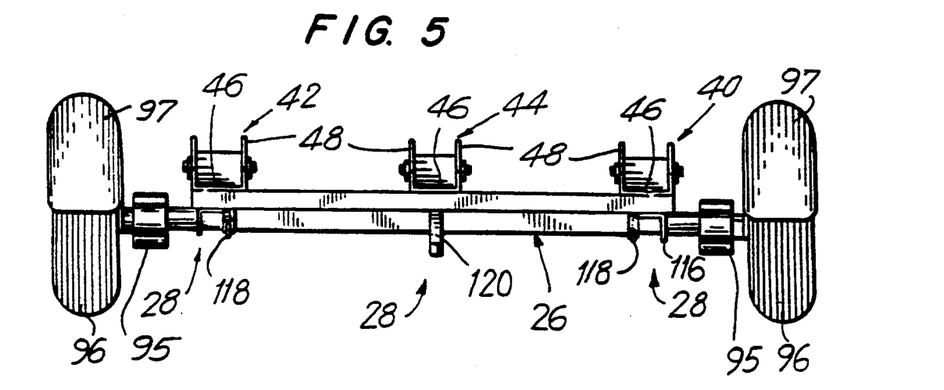
FIG. 5 is a rear elevational view of a collapsible trailer constructed in accordance with the invention.
Figure 6:
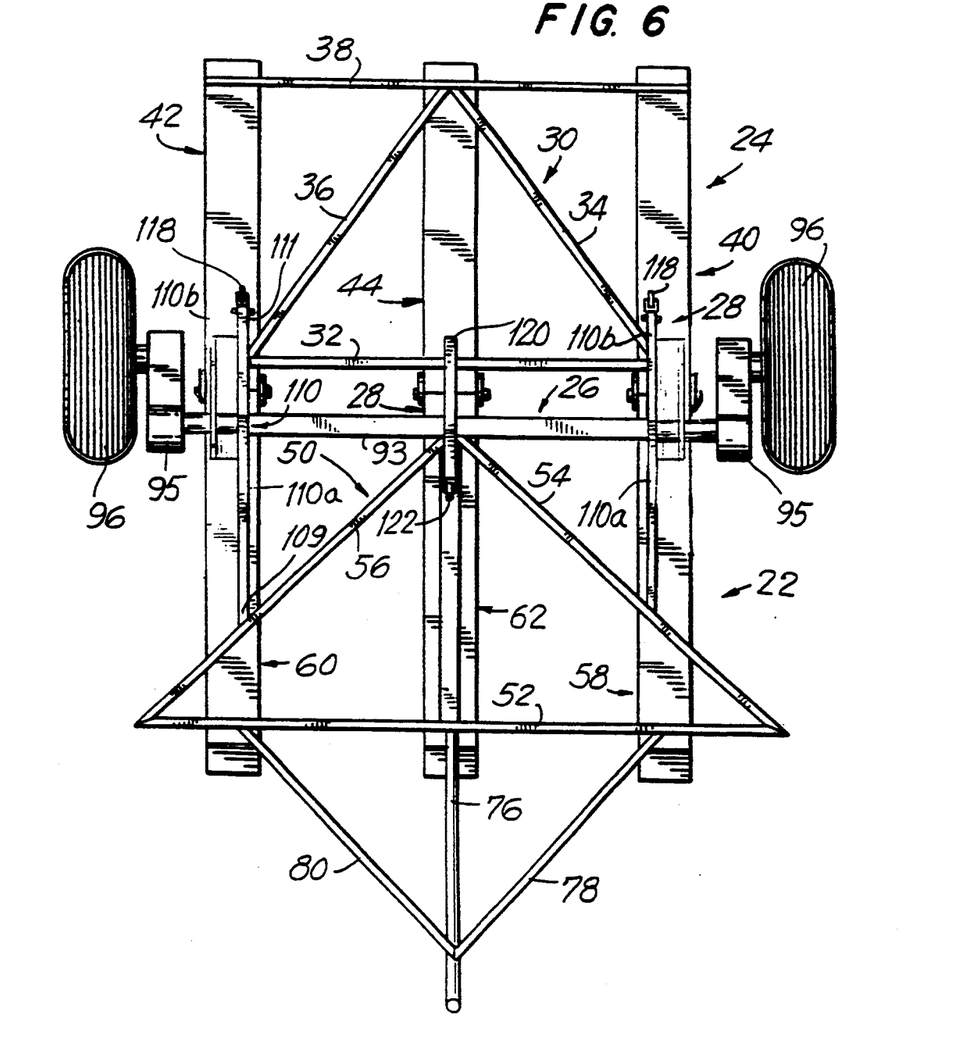
FIG. 6 is a bottom plan view of a collapsible trailer constructed in accordance with the invention.

As more particularly shown in FIG. 6, rear platform 24 includes a triangular frame 30 having a base 32, a first leg 34 and a second leg 36. In a preferred embodiment, triangular frame 30 is an isosceles triangle formed of tubular steel. A cross bar 38 extends parallel to base 32 across a portion of triangle 30 where leg 34 intersects leg 36. A first rail 40 is mounted on cross bar 38, leg 34 and base 32. A second rail 42 is fixedly disposed on cross bar 38, leg 36 and base 32 substantially parallel with rail 40. A third rail 44 is mounted on cross bar 38, first leg 34, second leg 36 and base 32 of triangle 30 and is disposed between and substantially parallel to rails 40, 42. Each rail 40, 42, 44 has a floor 46 extending into opposed sides 48 forming a channel therebetween. The width of the channel is dimensioned to receive and guide a motorcycle tire therein.

By mounting rails 40, 42, 44 on triangular frame 30 and cross bar 38 rails 40, 42 and 44 are maintained fixed relative to each other. Additionally, by extending support members in the form of base 32, legs 34, 36 and cross bar 38 a support frame work is provided for supporting rails 40, 42, 44 which shares the load between rails 40, 42, 44 without utilizing a great deal of material. This reduces the weight of rear platform 24 as well as reducing the complexity of the design.

Front platform 22 has a similar construction to that of rear platform 24. A triangular frame 50 is formed with a base 52, first leg 54 and second leg 56 which are joined together to form a substantially isosceles triangle. Base 52, legs 54 and 56 are formed of tubular steel. A first rail 58 is fixedly supported between base 52 and first leg 54. The second rail 60 is also supported on triangular frame 50 between base 52 and second leg 56. A third rail 62 is fixedly mounted on triangle 50 between base 52, first leg 54 and second leg 56. Like rails 40-44, rails 58, 60 and 62 are each formed with a floor 66 which separates sides 68 to form a channel through each respective rail. Each of rails 58, 60 and 62 is formed at one end with a ramp portion 70, 72 and 74, respectively, which extend at an angle upward from floor 62 to provide a front stop within the channel formed by each respective rail.

A trailer hitch 76 extends along and beyond rail 62 and is further supported by a first support member 78 and second support member 80 forming a triangle with cross bar 52. Center rail 62 is supported on trailer hitch 76 while rails 58, 60 are supported on support members 78, 80 respectively. Trailer 20 is towed by hooking trailer hitch 76 to a car, truck or the like.

Figure 7:
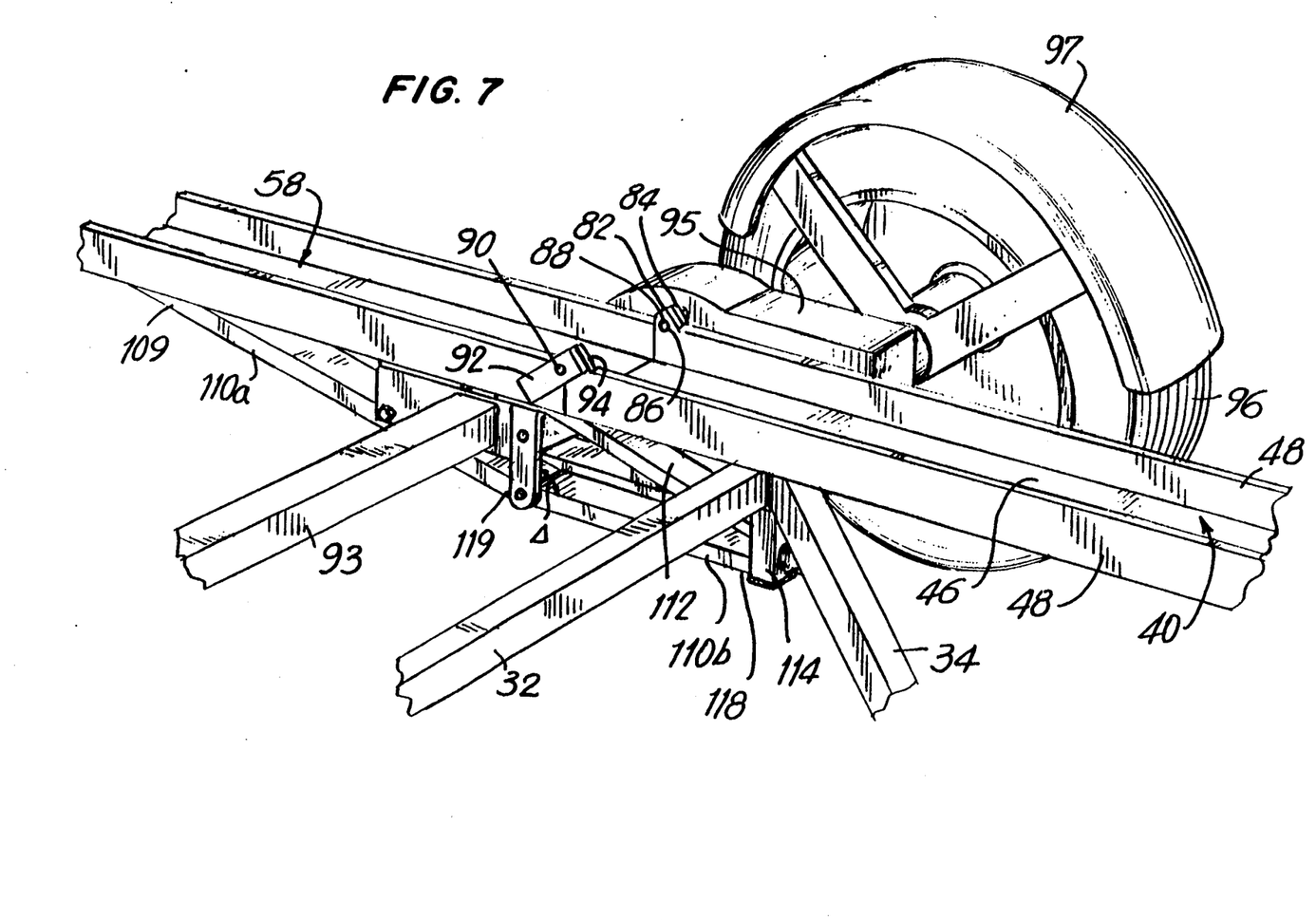
FIG. 7 is a partial view of the collapsible trailer constructed in accordance with the invention in the open position.

Rear platform 24 is pivotably connected to front platform 22 at rail pairs 40, 58; 44, 62; and 42, 60. Reference is made to FIG. 7 in which the pivotable connection between rail 40 and 58 is shown by way of example, each remaining rail pair being similarly coupled. Rail 40 is abuttedly disposed next to rail 58 so that a continuous channel is formed between rail 40 and rail 58. Rail 40 is formed with a pivot portion 82 having a hole therein. Rail 58 is also formed with a pivot portion 84 having a hole therein which communicates with hole 86 formed in pivot portion 82 of rail 40. A bolt 88 or the like is inserted through the communicating holes to provide a pivot axis for rail 40. Similarly, at a position across the channel formed in rails 40, 58 a bolt 90 passes through a pivot portion 92 and 94 of rails 58, 40, respectively. Accordingly, trailer 20 may collapse on itself by folding in half, by pivoting either rail 40 or rail 58 about the axis formed by bolts 88, 90. A corresponding bolt pair 88, 90 is provided at each rail pair.

Wheel assembly 26 includes a rubber suspension axle having an outer steel tube 93 containing rubber dampening elements therein. Shoulders 94 are provided at either side of outer tube 93 and are mechanically coupled to the rubber dampening mechanism contained within tube 93. Accordingly, shoulders 94 rotate relative to tube 93 independently of each other. Wheels 96 are rotatably mounted to each shoulder 95. Rails 70, 72 and 74 are also mounted on tube 93 so that tube 93 provides support and suspension above the ground for collapsible trailer 20. Additionally, tube 93 transfers the load at substantially the center of collapsible trailer 20 to the wheels 96. Fenders 97 are mounted on shoulders 94 and cover a portion of wheels 96. By utilizing such a suspension, an independent suspension is provided for shock absorption providing a smoother ride without the added structures required to utilize leaf spring construction. Such a hexagonal rubber suspension axle is manufactured by Al-Ko.

Reference is now also made to FIGS. 7-11 wherein support assemblies 28 are depicted in detail. Support assembly 28 is formed of three structures, one adjacent one wheel 96, one adjacent the other wheel 96 and one substantially centered between the first two structures.

Figure 8:
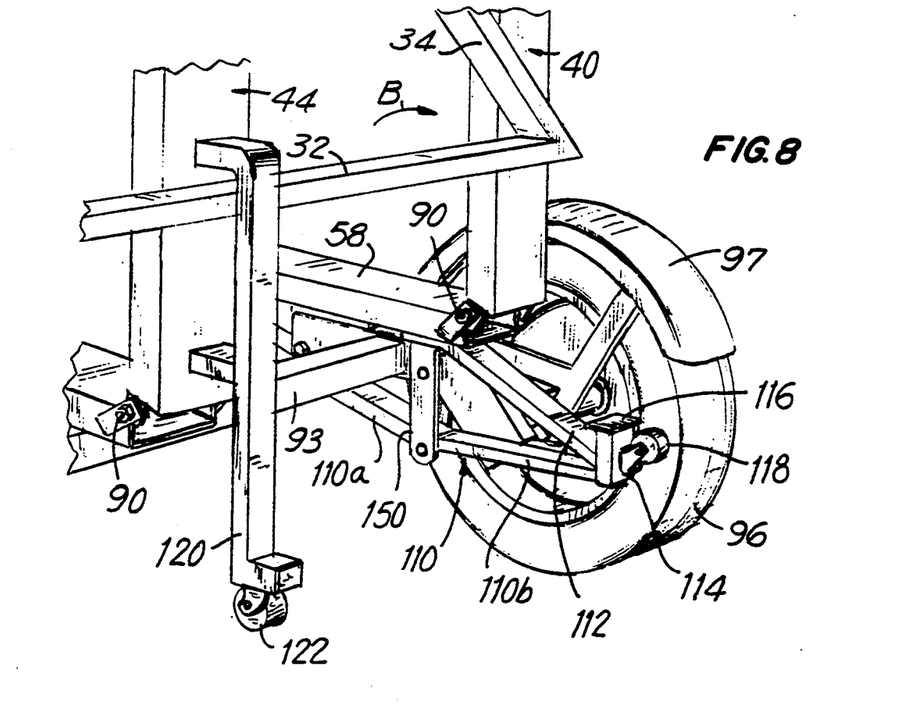
FIG. 8 is a partial view showing the collapsible trailer constructed in accordance with the invention between the open and closed positions.
Figure 9:
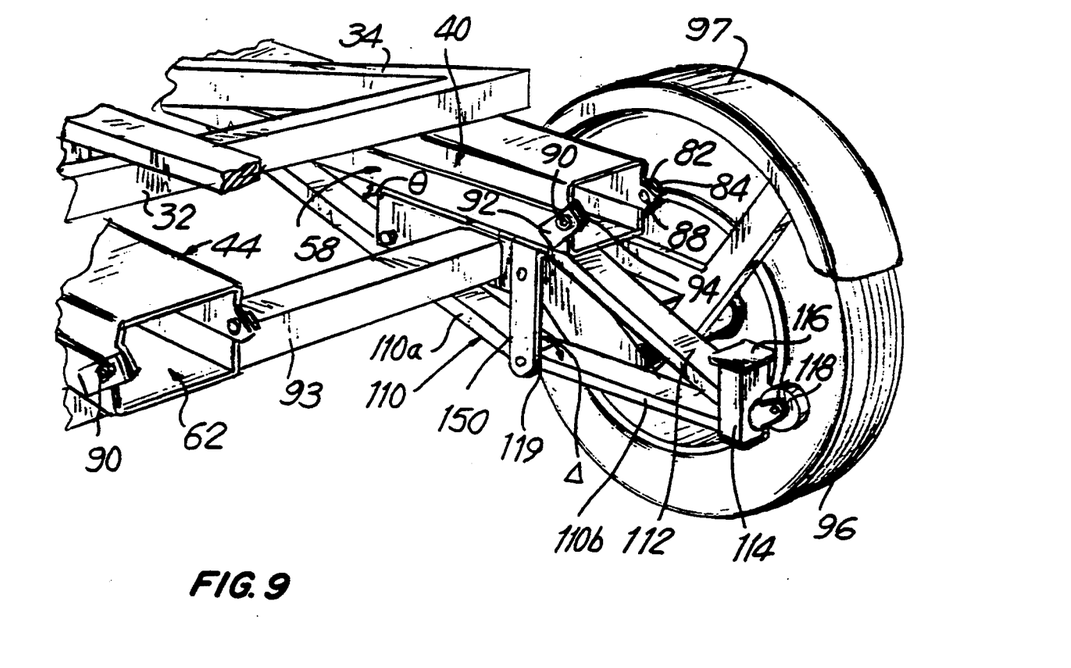
FIG. 9 is a partial view of the collapsible trailer constructed in accordance with the invention in the closed position.
Figure 10:
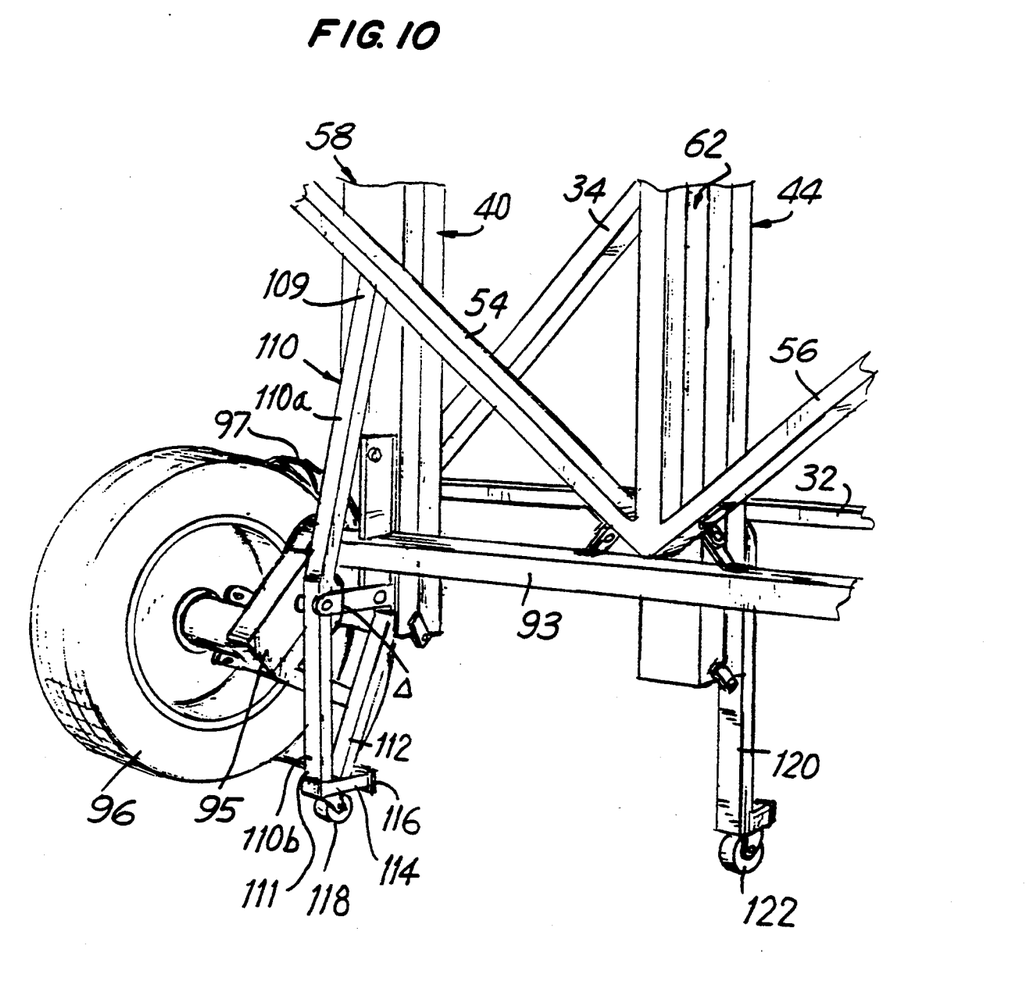
FIG. 10 is a partial view of the collapsible trailer constructed in accordance with the invention in the closed position after tilting into an upright position relative to the ground.

The support assembly portion adjacent right tire 96 (as seen in FIG. 6) is shown in FIGS. 7-10 and includes a support arm generally indicated as 110. Support arm 110 is formed with a proximal end 109 and a distal end 111. Support arm 110 is mounted to rail 58 and base leg 54 at proximal end 109 at a position substantially spaced from the end of rail 58 which abuts the end of rail 40 and adjacent a portion of triangular frame 50. Support arm 110 has a first arm portion 110a which extends away from rail 50 at an angle Θ (FIG. 9). A second arm portion integrally formed with portion 110a extends from portion 110a at an angle Δ towards rail 40, when rail 40 is in the open position, i.e., not folded upon rail 58. Portion 110b extends at an angle Δ relative to portion 110a forming an elbow 119 in support arm 110. A support member 114 is mounted at the distal end of support arm 110. A second support arm 112 extends from rail 58 to support member 114 to provide additional support for support member 114 and forms two sides of a triangle with second arm portion 110d of support arm 110. A support pad 116 having an area greater than support member 114 is mounted on support member 114 and comes in contact with rail 40 when collapsible trailer 10 is in the open (unfolded) position. Support arm 110 and support arm 112 extend beyond wheel 96. A bracket 150 extends from elbow 119 to rail 58 providing further load support between rail 58 and support arm 110. A caster 118 is mounted on support member 114 and is disposed substantially orthogonally with support pad 116.

Support arm 110 is dimensioned so that proximal end 109 is affixed to rail 58 a substantial distance away from the center of rotation of rail 40 relative to rail 58 and that distal end 111 also extends a distance substantially away from the pivot point to contact rail 40 near frame 30. When trailer 20 is in the open position, rail 40 is supported on pad 116 and rail 58 is supported by support arm 110 at proximal end 109. Because of elbow 119 a portion of a downward force applied to support pad 116 changes direction from a downward force along second arm portion 110b to an upward force along first arm support section 110a. Because support arm 110 is formed as an integral unit, formed with an elbow 119, a portion of the load applied at one rail is shared with the other rail, i.e., a load applied to rail 40 is not totally supported by rail 40 but is shared with rail 58 easing the amount of load required to be supported by one rail acting independently.

Figure 11:
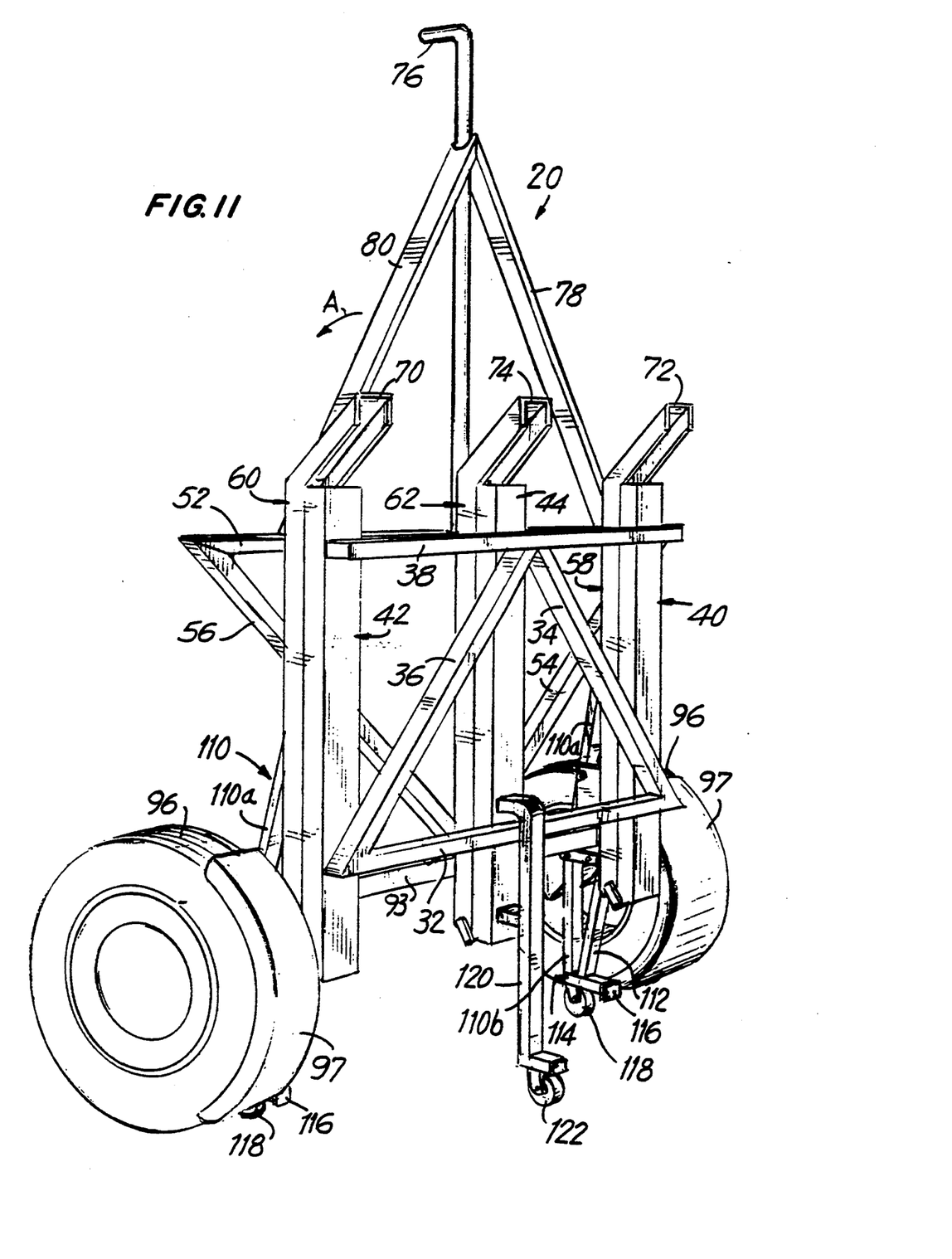
FIG. 11 is a perspective view of the collapsible trailer constructed in accordance with the invention in the upright position.

An identical support structure assembly is provided adjacent the opposite wheel 96 at the other end of tube 93. Like parts are identified by like numerals so that, as seen in FIGS. 6 and 11 a support arm 110 having an upper portion 110a extends from rail 60. A support platform 116 and caster 122 are supported at an end of support arm 110.

The center portion of the support assembly includes a single support leg 120 extending from rail 144. Caster 118 is mounted thereon. Although not shown, in the contemplated embodiment a second opposed support leg 120 may be mounted on rail 62.

Operation of the collapsible trailer will now be discussed in connection with FIGS. 1–11 beginning with storage of the trailer as shown in FIG. 11. Trailer 20 is stored in the closed position in an upright manner. In the closed position, rails 40, 42, 44 are folded to overlap rails 58, 60, 62, respectively. Because support arms 110 and support legs 120 extend beyond wheel 96, when trailer 20 is in the upright position, the entire trailer 20 will be supported on the ground by casters 118, 122. Wheels 96 are lifted from the ground. Trailer 20 may now be slidably moved either into or out of storage. Because arms 110 are in an opposed spaced relationship from support leg 120, a stable three point movable base is provided for trailer 20. The support assembly thereby provides a first type of support to support the trailer in an upright position.

A conservation of space is provided in this folded position. In the open or trailer use mode collapsible trailer 20 is one hundred and four inches long and sixty-eight inches wide. when folded and rotated into the upright position shown at FIG. 11 collapsible trailer 20 is sixty-eight inches wide only eighty inches high and twenty-two inches deep. Accordingly, during storage rather than requiring the same space as a small car if it is stored in the open position, collapsible 20 may be folded and wheeled into a space substantially twenty-two inches deep and eighty inches high.

To utilize trailer 20, trailer 20 is rolled from storage and pivoted about steel tube 93 in the direction of arrow A of FIG. 11 so that support shifts from casters 118, 122 to wheels 96 as shown in FIG. 9. Rear frame portion 24 is then rotated in the direction of arrow B as shown in FIG. 8 away from front frame portion 22, about the pivot axis formed by bolts 90. Rear platform portion 24 is rotated until rails 40, 42 come in contact with platforms 116. In this position, rails 40, 42, 44 form continuous channels with rails 58, 60, 62, respectively. Both support arms 110 provide support between the channels of a front platform portion and the rear platform portion. Support for the platforms is also provided by triangular frames 30, 50 as well as tube 93 and cross bar 38. Accordingly, when a motorcycle or the like is wheeled onto collapsible trailer 20, the motorcycle will first be wheeled onto a respective rail of rear platform 24, rail 40 by way of example. As the motorcycle is wheeled onto rail 40, the load upon rail 40 will increase.

In the prior art trailer this would cause an undue stress on rail 40 about the pivot point causing the collapsible trailer to break at the pivot point. However, as the load on rail 40 increases, a portion of that load is transferred through support arm 110 through pad 116 from rail 40 to rail 58 so that the load is shared while the entire mass of the motorcycle is on rear platform 24. This prevents rail 40 from pivoting beyond the open position. As a motorcycle is moved farther through the channel, the motorcycle will enter rail 58 so that the load is shared directly between rail 58 and rail 40. Additionally, by providing a unibody substructure by way of base 32 and legs 34, 36 a portion of the load is transferred between rail 40 and rails 44, 46.

Collapsible trailer 20 has a unibody construction-Each member is connected to and abuts another body member. By way of example support arm 110 abuts a rail and triangular frame 50. Triangular frames 30, 50 are formed so that each base and leg abuts another base or leg providing mutual support to each other, i.e. anchoring each other against movement, providing support and load sharing capabilities.

By providing a collapsible trailer having at least one support arm coming in contact with a rail from a rear platform portion and a rail from a front platform portion at points substantially distant from the pivot point of the respective rails, a more efficient manner for supporting the load requiring less materials is provided. By a providing a bend in the arm the efficiency of load transfer increases as $F \cos \Delta$ where $\Delta$ is the angle of the bend of the elbow. By supporting the platform upon independent suspension axle utilizing shoulders at either end of a support tube, the amount of material required to support the trailer while providing a stable ride is decreased and allows for the movement of the wheel to decrease the thickness of the trailer during use.

The above embodiment utilizes three channels formed by rail pairs. This is by of way example and the invention functions equally as well utilizing as few as one channel or more than three channels. Additionally, the collapsible trailer may also be utilized for three wheel vehicles and four wheel vehicles, not just motorcycles used by way of example. Lastly, the trailer may easily be converted, utilizing runner type bearing members, to accommodate jet skis or the like.

It will thus be seen that the objects set forth above, among those made apparent from the preceding description, are efficiently attained and, since certain changes may be made to the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A collapsible trailer comprising a first platform, a second platform pivotably mounted on said first platform so that said second platform pivots between an open position and a closed position, and load sharing means mounted on said first platform and contacting said second platform when said collapsible trailer is in said open position for sharing a load applied to said second platform between said first platform and said second platform; said load sharing means further supporting said collapsible trailer above the ground when said second platform is in the closed position; said load sharing means including a support arm extending from said first platform to said second platform, said support arm having a first end and a second end, a support pad mounted at said second end for supporting said second platform when said collapsible trailer is in the open position, and a support leg mounted on said second platform so that said first leg and support arm are disposed across a gap when said second platform is in the closed position.

2. The collapsible trailer of claim 1, further comprising a first caster mounted on said support leg and a second caster mounted on said support arm.

3. A collapsible trailer comprising a first platform, a second platform pivotably mounted on said first platform so that said second platform pivots between an open position and a closed position, and load sharing means mounted on said first platform and contacting said second platform when said collapsible trailer is in said open position for sharing a load applied to said second platform between said first platform and said second platform; said load sharing means further supporting said collapsible trailer above the ground when said second platform is in the closed position; said load sharing means including a support arm extending from said first platform to said second platform, said support arm having a first end and a second end, a support pad mounted at said second end for supporting said second platform when said collapsible trailer is in the open position; and an elbow is formed in said support arm between said first end and said second end.

4. A collapsible trailer comprising a first platform, a second platform pivotably mounted on said first platform so that said second platform pivots between an open position and a closed position, and load sharing means being mounted on said first platform and contacting said second platform when said collapsible trailer is in said open position for sharing a load applied to said first platform between said first platform and said second platform, wheel assembly means for affixing wheels to said collapsible trailer and supporting said collapsible trailer above the ground when said second platform is in the open position; said wheel assembly means including a support bar mounted to said first platform and a least one wheel being mounted at either side of said support bar; said load sharing means further supporting said collapsible trailer above the ground when said second platform is in the closed position; said support means including a support arm extending from said first platform to said second platform, said support arm having a first end and a second end, a support pad mounted at said second end for supporting said second platform when said collapsible trailer is in the first position; and a support leg mounted on said second platform so that said first leg and support arm are disposed across a gap when said second platform is in the closed position.

5. The collapsible trailer of claim 4, further comprising a first caster mounted on said support leg and a second caster mounted on said support arm;

6. The collapsible trailer of claim 4, wherein an elbow is formed in said support arm between said first end and said second end.

7. The collapsible trailer of claim 4, wherein said first platform includes a triangular frame and at least one rail formed on said triangular frame.

8. The collapsible trailer of claim 7, wherein said second platform includes a triangular frame and at least one rail formed on said triangular frame and said first rail cooperating with said second rail to form a channel extending across said collapsible trailer when in said open position.

* * * * *